UNITED STATES PATENT OFFICE.

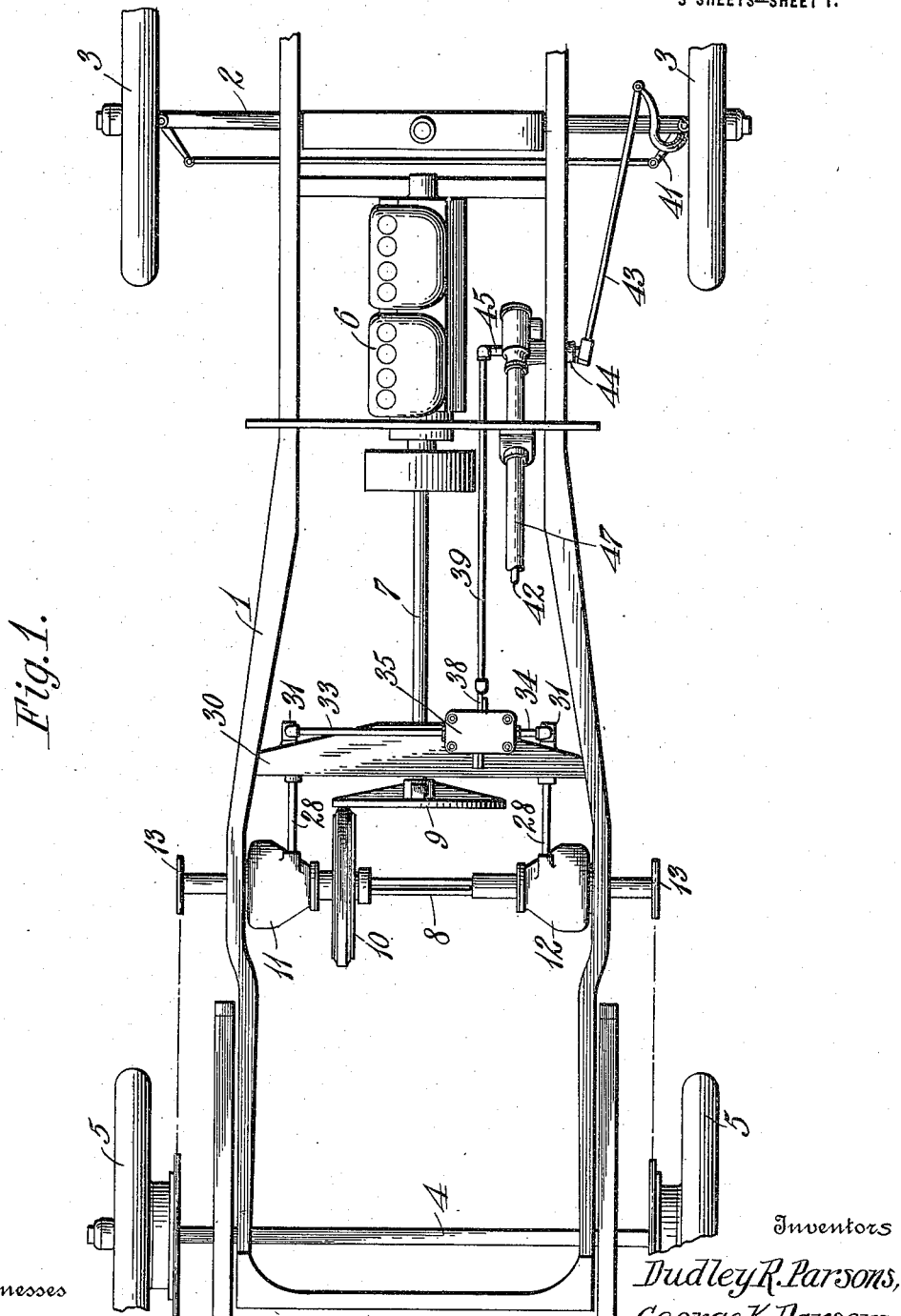

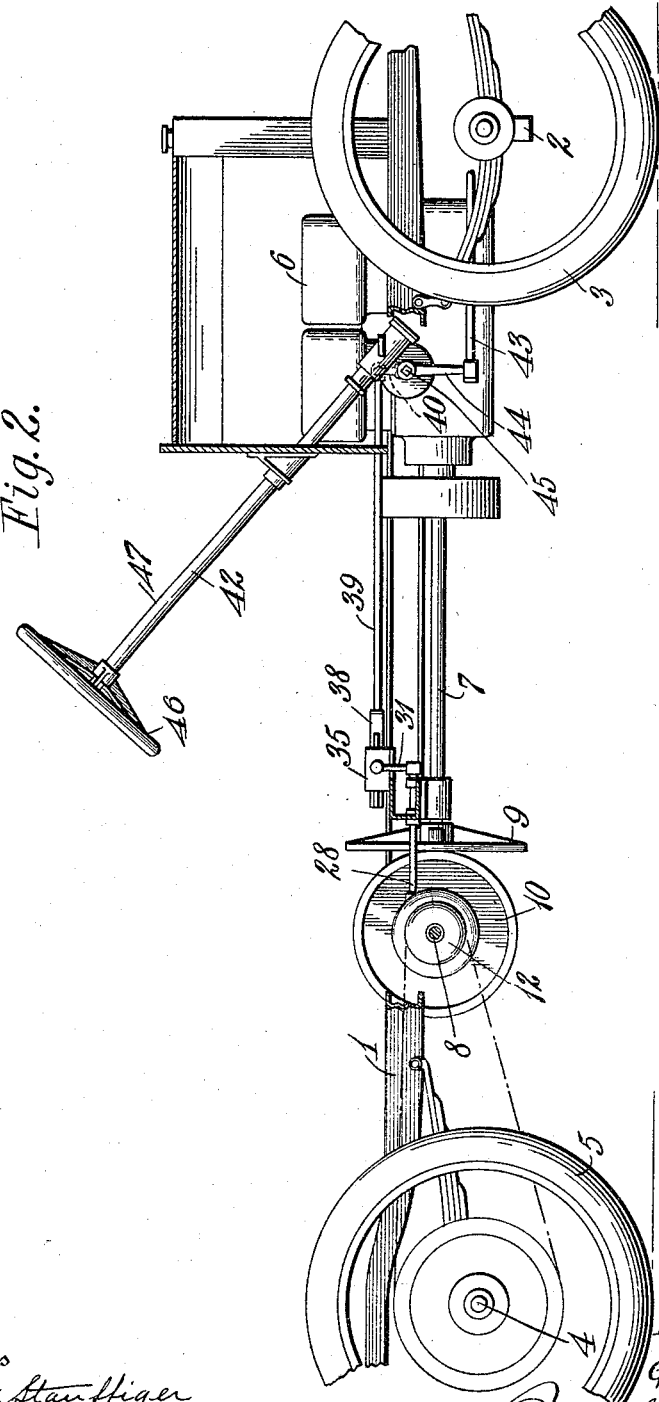

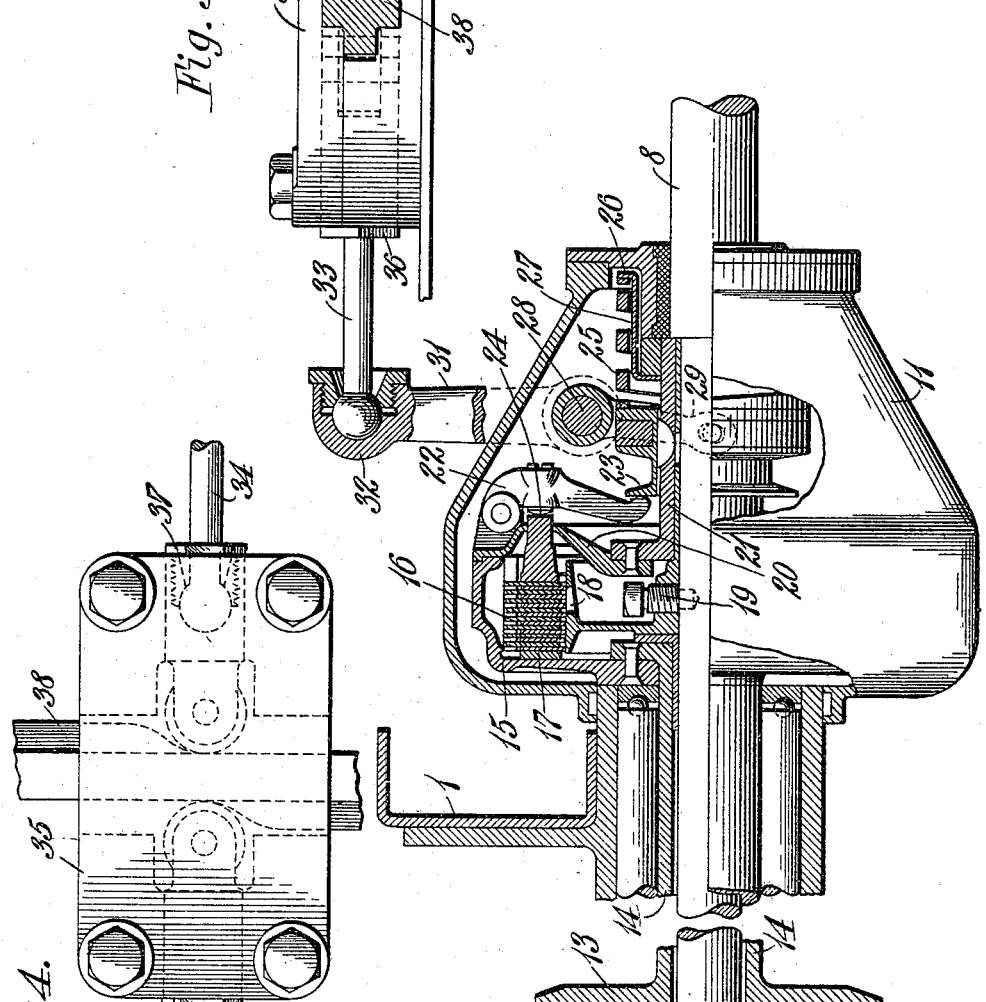

DUDLEY R. PARSONS AND GEORGE K. PARSONS, OF DETROIT, MICHIGAN.

MOTOR-VEHICLE.

1,147,043.  Specification of Letters Patent.  Patented July 20, 1915.

Application filed July 15, 1912. Serial No. 709,316.

*To all whom it may concern:*

Be it known that we, DUDLEY R. PARSONS and GEORGE K. PARSONS, citizens of the United States of America, residing at Detroit, in the county of Wayne and State of Michigan, have invented certain new and useful Improvements in Motor-Vehicles, of which the following is a specification, reference being had therein to the accompanying drawings.

This invention relates to a motor vehicle wherein provision is made for permitting the driving or traction wheels to accommodate themselves to paths of travel of different length in rounding corners or the like, without the use of differential mechanism usually employed.

The invention consists in the matters hereinafter set forth and more particularly pointed out in the appended claims.

In the drawings, Figure 1 is a plan view of a vehicle chassis partially broken away together with a power plant and transmission mechanism that embody features of the invention; Fig. 2 is a view partially in side elevation and partially in section of the chassis; Fig. 3 is a view in vertical section, partially broken away, of a left hand drive clutch; and Fig. 4 is a plan view in detail of a clutch operating device.

Referring to the drawings, a chassis frame 1 of appropriate design is yieldingly supported on a forward axle 2 with guide wheels 3 and on a rear axle 4 with traction bearing wheels 5.

A motor 6 of any preferred and appropriate type is mounted on the forward portion of the chassis with a longitudinally disposed transmission shaft 7 extending rearwardly through suitable bearings, preferably in direct alinement with the motor shaft. A jack shaft 8 is journaled transversely of the chassis and is driven from the transmission shaft 7 by any appropriate mechanism affording change of speed and reversal of direction. Preferably the device herein shown is used, consisting of a main drive disk 9 in rolling contact with a frictional follower disk 10 that is shiftable transversely on the square or splined middle portion of the jack shaft 8.

A pair of oppositely disposed clutch casings 11 and 12 are mounted near each end of the jack shaft 8. Each houses a clutch of the multiple disk type as herein indicated although such clutch may be obviously of any suitable design. As herein shown, a sprocket wheel 13 has a tubular hub 14 to the inner flanged end of which a ring drum 15 is suitably secured. The latter carries a series of friction rings 16 which alternate with friction disks 17 keyed or otherwise secured to rotate with a drum 18 that is secured as by a cap screw 19 or other suitable means to the jack shaft 8. A spider 20 mounted on a sleeve 21 concentric with the shaft 8 on which it is journaled affords pivotal support for presser arms 22 that are attached at one end to the spider and bear outwardly at the other end against the slide collar 23, studs 24 bearing against the series of rings 16 and disks 17 being engaged by these arms to compress the disks and rings together. The slide collar is normally projected to hold the parts in frictional engagement by a suitably disposed spring member 25 in compression between the collar and the flange 26 of a stop sleeve 27. A transversely disposed rock shaft 28 is journaled in the casing 11 and is provided with rock arms 29 entering a peripheral slot in the collar 23 to positively move the latter when the shaft is turned. The outer end portion of the rock shaft, which preferably extends through and is journaled in a transverse member 30 of the chassis, has a rock arm 31 oppositely disposed to the collar engaging arm 29 and articulated as by a ball and socket connection indicated at 32 with a slide rod, the clutch in the casing 11 being controlled by the rod 33 and that in the casing 12 being similarly operated by the slide rod 34.

A housing 35 has guide apertures in which friction roller bearing blocks 36 and 37 are oppositely reciprocable, the former being articulated as by a ball and socket connection to the rod 33 and the latter being similarly secured to the rod 34. Friction rolls on the inner ends of these blocks bear respectively against cam faces on the opposite sides of a cam rod 38 that is reciprocable in the housing and is coupled by a link 39 with a lever 40. The cams are so disposed that movement of the cam rod in one direction operates the rod 33 and reciprocates the rod 34 when moved in reverse manner.

The guide wheels 3 are controlled by the usual steering knuckle connections indicated at 41 from a steering wheel shaft 42 that is connected thereto through the medium of a link 43 and lever 44 oppositely disposed to the lever 40 and secured on the rock shaft 45 that is oscillated through suitable mechanism, not shown, by turning the steering wheel and shaft in a post 47.

In operation, the turning of the guide wheels by manipulation of the steering wheel likewise reciprocates the cam rod in the slide rod housing so that the clutches are alternately engaged and disengaged as the vehicle veers in one direction or the other thus leaving one of the sprockets free on the jack shaft. The latter are appropriately connected as indicated diagrammatically with the traction bearing wheels so that the latter are free to accommodate themselves as desired to paths of travel of different length. This construction obviates the use of complicated differential gearing that is common in self propelled vehicles and furthermore insures the proper application of power to the traction wheels when turning a corner.

One result of this construction is that the power may be applied at the will of the car operator to either one of the traction wheels in case the vehicle becomes stalled. In the ordinary differential drive mechanism, the retarded wheel becomes idle and the other wheel has to draw it out or over the obstruction which holds it. In operating this mechanism, power may be applied to the wheel which is in a rut or hole, or which has to be lifted over an object by merely shifting the steering wheel temporarily until the obstruction is past. This is a very valuable feature in the manipulation of heavily loaded trucks.

Obviously, changes in the details of construction may be made without departing from the spirit of the invention and we do not care to limit ourselves to any particular form or arrangement of parts.

What we claim is:—

1. In a motor vehicle, a chassis, a clutch driving member thereon, a pair of oppositely disposed traction-bearing wheel operating clutches adapted to be driven by said member, means for throwing each clutch out of engagement with said member, a cam rod shiftable longitudinally of the chassis adapted when moved in one direction to operate the throw out member of one clutch and when moved in the opposite direction to operate the throw out member of the other clutch, and steering means operatively connected to the cam rod whereby the latter throws out the clutches in accordance with the operation of the steering gear.

2. In a motor vehicle, a chassis, a jack shaft on the chassis, traction bearing wheel operating clutches each mounted on an end portion of the jack shaft, a rock arm for each clutch for throwing the latter out of engagement with the shaft, a cam rod shiftable longitudinally of the chassis adapted when moved in one direction to operate the disengaging rock arm of one clutch and when moved in the opposite direction to disengage the other clutch rock arm and steering means operatively connected to the cam member whereby the latter throws out the clutches in accordance with the operation of the steering gear, each of the rock arms being free to return to operative position when the cam rod is in neutral position or is engaging the other rock arm.

3. In a motor vehicle, a chassis, a jack shaft on the chassis, traction-bearing-wheel operating clutches oppositely disposed on the end portions of the jack shaft, rock arms for throwing the clutches out of engagement with the shaft extending rearwardly from the clutches, rods extending from the rock arms, a housing on the chassis, roller bearing blocks oppositely reciprocable in the housing each articulated to a rod, a cam rod reciprocable longitudinally of the chassis passing through the housing and engaging the roller bearing blocks to shift them in opposite directions and steering means operatively connected to the cam rod whereby the latter throws out the clutches in accordance with the operation of the steering gear.

In testimony whereof we affix our signatures in presence of two witnesses.

DUDLEY R. PARSONS.
GEORGE K. PARSONS.

Witnesses:
ANNA M. DORR,
C. R. STICKNEY.

Copies of this patent may be obtained for five cents each, by addressing the "Commissioner of Patents, Washington, D. C."